United States Patent
Hardisty et al.

(10) Patent No.: US 6,981,753 B2
(45) Date of Patent: Jan. 3, 2006

(54) GLASS-FIBER THERMAL INKJET PRINT HEAD

(75) Inventors: Jaime S. Hardisty, Albany, OR (US); Jeremy H. Donaldson, Corvallis, OR (US); Roger J. Kolodziej, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 10/402,677

(22) Filed: Mar. 28, 2003

(65) Prior Publication Data

US 2003/0201246 A1     Oct. 30, 2003

Related U.S. Application Data

(62) Division of application No. 10/074,565, filed on Feb. 11, 2002, now Pat. No. 6,565,760.

(51) Int. Cl.
*B41J 29/38*     (2006.01)
*B41J 2/05*     (2006.01)

(52) U.S. Cl. .......................................... 347/13; 347/57

(58) Field of Classification Search ................... 347/5, 347/9–13, 57, 112, 140, 210, 211, 237, 238
See application file for complete search history.

(56) References Cited

U.S. PATENT DOCUMENTS

| | | | | |
|---|---|---|---|---|
| 5,504,505 A | * | 4/1996 | Tamura et al. | 347/13 |
| 5,835,115 A | * | 11/1998 | Kitazawa | 347/57 |
| 5,969,744 A | * | 10/1999 | Sakashita et al. | 347/237 |
| 6,243,111 B1 | * | 6/2001 | Imanaka et al. | 347/13 |

* cited by examiner

*Primary Examiner*—Stephen Meier
*Assistant Examiner*—An H. Do

(57) ABSTRACT

A page-wide inkjet print head is formed by assembling individual glass fiber tube sections, which are then sintered together drawn to thin or neck the diameter of the orifices, slicing the glass tube sections and depositing individual semiconductor control circuits in or approximate to the top of the glass tube sections. Ink reservoirs can supply water based ink that flows through the glass tube sections but which is held in place by capillary action. Ink is ejected by heating a semiconductor resistive element deposited into one open end of the tube section so as to cause the ink to be ejected onto a print medium.

1 Claim, 7 Drawing Sheets

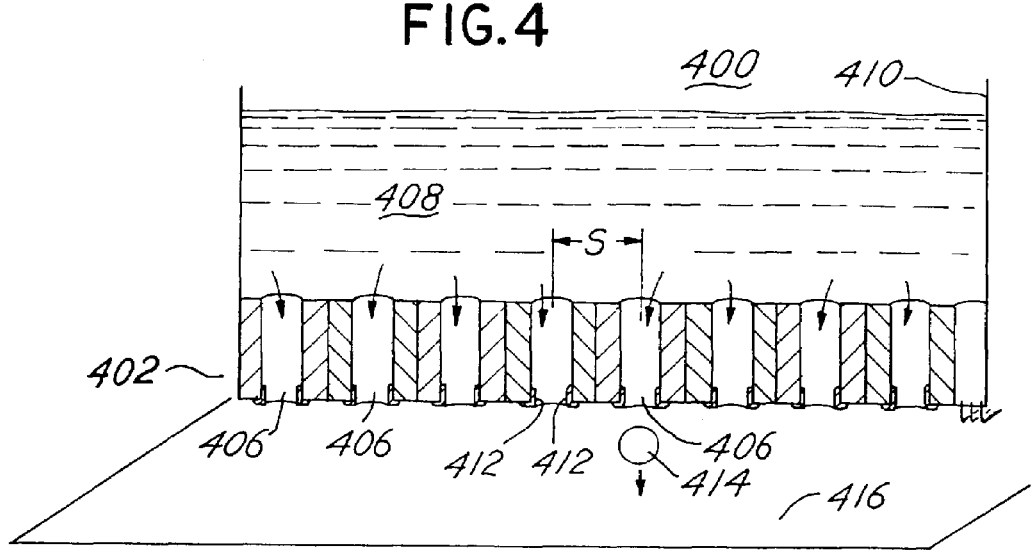
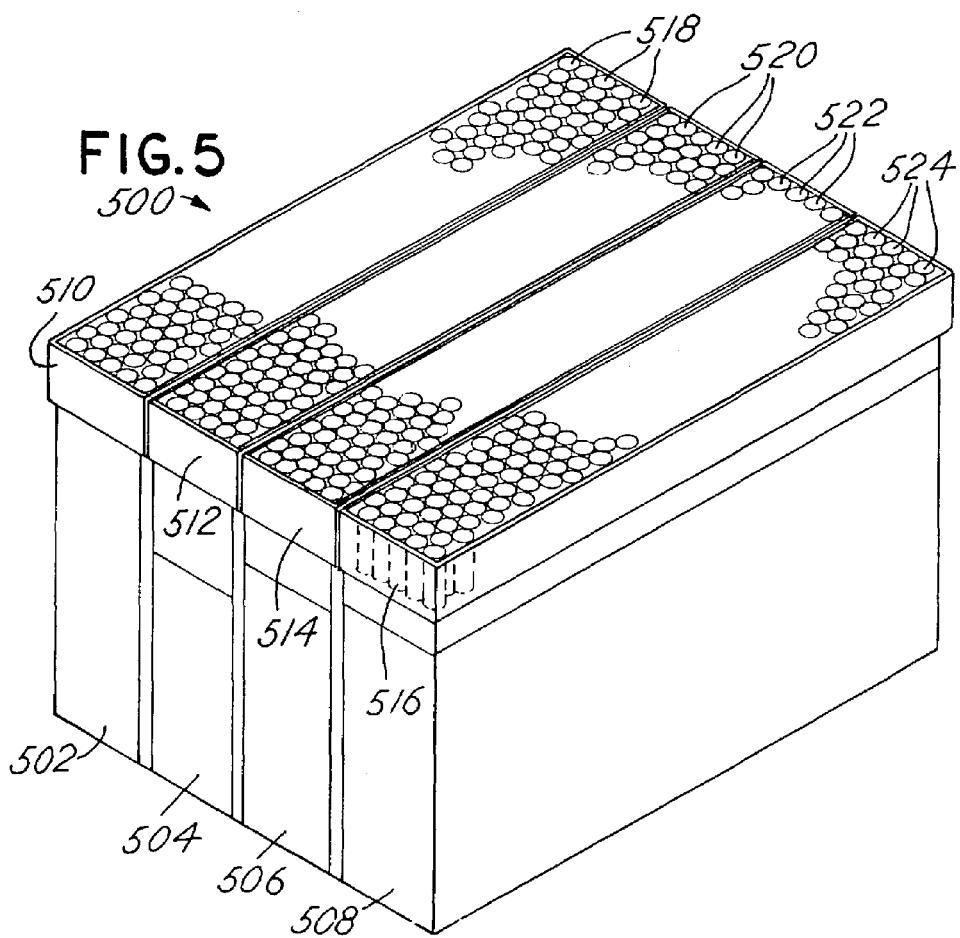

INK FLOW

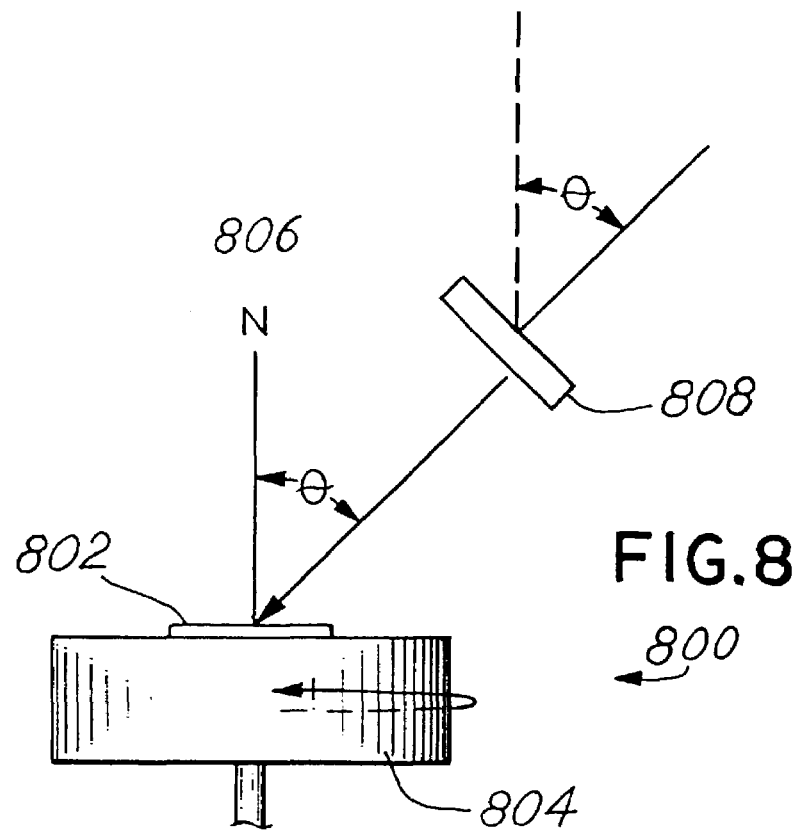
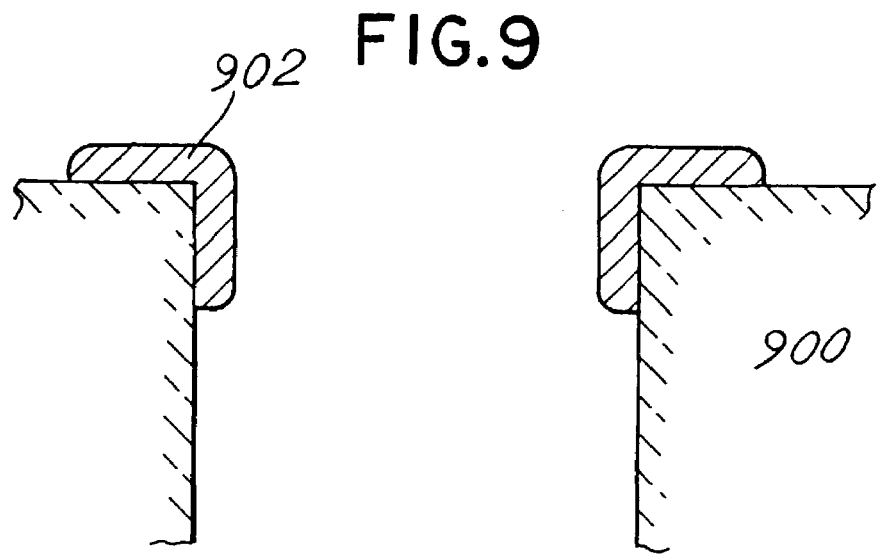

GLASS-FIBER THERMAL INKJET PRINT HEAD

CROSS REFERENCE TO RELATED APPLICATION(S)

This is a divisional of application Ser. No. 10/074,565 filed on Feb. 11, 2002, now U.S. Pat. No. 6,565,760 which is hereby incorporated by reference herein.

FIELD OF THE INVENTION

This invention relates to ink jet printers. In particular, this invention relates to a novel design and method of manufacture of a thermal inkjet print head.

BACKGROUND OF THE INVENTION

Thermal inkjet printers have become ubiquitous.

These printers typically use semiconductor-based print heads which have individually-controlled ink-ejecting printing elements that heat water-based inks to vaporization. Vaporizing the ink causes it to be propelled onto a print media through microscopic holes formed in a plate or shield. Thermal energy to vaporize ink is supplied from electric current driven through small thin film resistors that are in thermal contact with ink, which is otherwise held in place within the print head by capillary effect.

Prior art thermal inkjet printers form images on print media by repeatedly passing a print head over the media. Small quantities of ink are "sprayed" onto the paper by turning on and turning off the thermal ink jet printing elements as the print head moves across the paper or print media.

At least one problem associated with existing inkjet printers is the speed at which these printers can produce acceptable quality output levels. Because a finite time is required for ink droplets to traverse the distance between the media and the print head, there is an upper speed limit for the print head beyond which further speed increases are not possible. Instead of moving the print head across the media, a method and apparatus by which an entire line of a page might be printed at once could provide a significant overall printing speed increase.

SUMMARY OF THE INVENTION

A page-wide printer head formed from glass fiber nozzles onto which are deposited semiconductor heating elements, and current driving circuitry, can print an entire line of a single page at one time using thermal ink jet action. Narrow glass tube ink conduits are formed from hollow glass fibers which are sintered together, drawn to constrict the diameters of the hollow fibers and then longitudinally sliced to provide an array of glass tube nozzle assemblies. By using semiconductor processing techniques, heater resistors and control circuitry is formed onto the glass surfaces The heater resistors are deposited into the interior of the hollow glass fibers where they are used to heat liquid-based ink and ink components to vaporization.

The current drive circuitry is comprised of transistor-controlled silicon controlled rectifiers ("SCRs") deposited onto the print head. The SCRs drive current through the heater resistors deposited into the open ends of the glass fibers. Hundreds or even thousands of individual current drive circuits, each circuit being comprised of a pair of SCRs wired in a series fashion, are fired by a control pulses delivered to a control transistor for each drive circuit. The current drive circuits of the SCRs are wired in a totem pole arrangement such that successive drive circuits are addressed by successive pulses on only two control lines wired to all of the series-connected drive circuits.

Predetermined individual SCRs are first latched "on" in sequence by a predetermined pulse in a synchronous train of pulses that are applied to the drive circuits. Individual drive circuits can be turned on or left off, i.e. in the SCR's non-conducting state. A single power pulse delivered to all of the drive circuits after the circuits are provided with the addressing pulse stream provides the electrical energy through the SCRs latched "on," to vaporize ink.

BRIEF DESCRIPTION OF THE DRAWINGS

FIG. 4 shows a simplified representation of a glass fiber, thermal inkjet print head in a cutaway view through several glass fiber tube sections coupled to an ink reservoir.

FIG. 5 shows a perspective view of a four color ink cartridge including four different ink reservoirs and four different print heads formed using sintered drawn and sliced glass fiber tubes.

FIG. 8 shows a simplified block diagram of the positioning of a sintered drawn and sliced glass printer head and a source of material used to form semiconductor materials in the ends of the sintered glass tubes.

FIG. 9 shows a simplified representation of how materials might be deposited into the interior portions of the tube sections using an apparatus such as that shown in FIG. 8.

DETAILED DESCRIPTION OF THE PREFERRED EMBODIMENT

Figure 1:
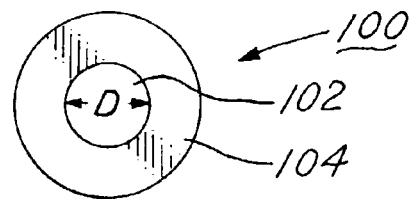
FIG. 1 shows a top view of a single hollow glass fiber tube section.

Glass fiber technology is well known. FIG. 1 shows a top view of an exemplary hollow glass fiber 100 having an inner tubular section 102 formed by etching away a differently formulated glass material inside the glass annulus 104. By forming the glass fiber 100 with a first type of glass around a second type of glass, it is possible to chemically etch or dissolve the second glass from within the first glass thereby leaving a hollow glass tube through which liquids (including gases) can flow.

Figure 2:
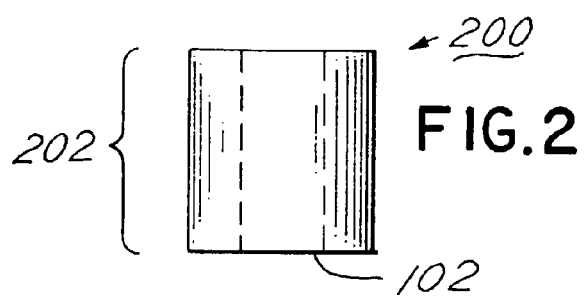
FIG. 2 shows a side view of a hollow section of glass fiber tube.

FIG. 2 shows a side view of a section of glass fiber 100 and the length or extension of the hollow portion 102 through the length of glass tube 202.

Figure 3A:
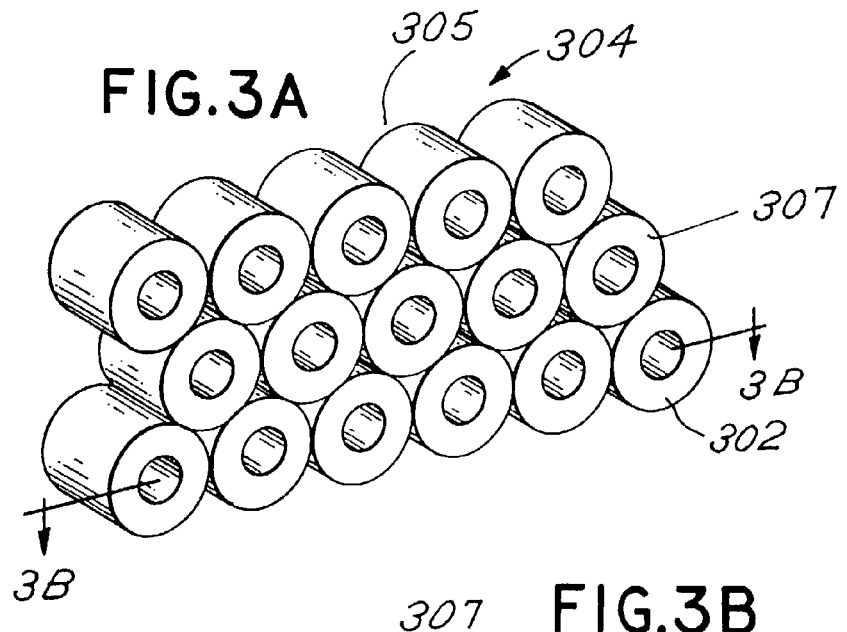
FIG. 3 shows an isometric view of several hollow glass fiber tube sections after sintering, drawing and slicing.
Figure 3B:
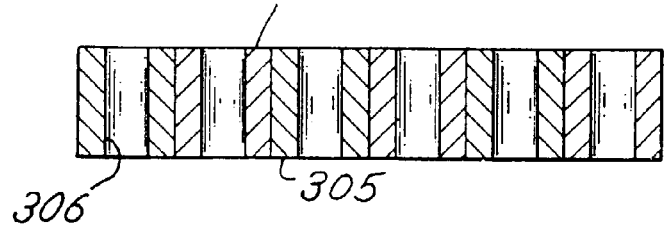

FIG. 3 shows an assembly of hollow glass tube sections 300 that is preferably formed by first bundling together several glass tube lengths, such as the length 202 shown in FIG. 2. The bundled glass fibers are then heated to a temperature at which the glass tube sections are sintered together thereby forming a monolithic, honeycomb-like structure of numerous orifices of some diameter D. The sintered tube sections are preferably drawn so as to significantly neck or decrease the inside diameter D of each tube section 302. After sintering and drawing, the tube sections are laterally sliced across a plane 304 to form a thin matrix of small-diameter glass tubes or capillaries 306 such as that shown in FIG. 3B. The resulting diameter of each glass tube must be sufficiently small so as to hold liquid based ink and ink components within the tubes by capillary effect. The largest-permissible diameter of the tubes to accomplish this will of course be affected by the composition and viscosity of the ink to be used. The diameter must also be sufficiently large so as provide a quantity of vaporized ink that will provide acceptable ink drop gain (drop spreading on the print media) without unduly large currents to heat unduly large ink volumes.

In FIG. 4, a section of a glass fiber print head 400 and the included glass capillary sections 402 are shown coupled to an ink reservoir 408. As set forth above, the diameter of the ink capillaries is sufficiently small such that ink 408 in an ink reservoir 408 is retained by capillary action in the tubes yet can be expelled by thermal energy supplied by resistors 412 that are deposited near the open ends of the tubes, using techniques described below.

Semiconductor electronic control circuitry 412 deposited on the glass print head 402 (not visible in FIG. 4) enables individual heater resistors in individual capillaries to be individually addressed so as to precisely control which capillaries have ink ejected from them. If the glass print head 402 extends across an entire page, printing a line of text on the page requires that ink be selectively ejected from some capillaries and not ejected from others so as to selectively deposit ink to form an image. An image or text can be formed one line at a time, across the entire page, by moving only the page being printed, i.e. without moving the print head 402. The spacing S between adjacent capillary tubes 406 in the preferred embodiment is typically small: center to center distance of adjacent nozzles are expected to be 10 to 200 microns, (20 microns is normal for a 1200 dpi design. A 150 to 1500 dpi device is believed to be achievable with this design. The design can also be made so a specific address row could address every 5th to 15th nozzle (the exact skip rate to be determined by the addressing circuit rate and the total print head length, and print head resolution in dpi).

FIG. 5 shows a simplified perspective drawing of a multi-color page-wide inkjet print cartridge formed to have four different colored ink reservoirs 502, 504, 506 and 508 coupled to a single glass-fiber print head that includes four distinct print head assemblies. (At least one alternate embodiment would include using an assembly of four individual glass fiber structures 512, 514 and 516.) Each reservoir holds a different color of ink. By separately controlling the ink deposition by the electrical signals applied to the glass fiber assemblies coupled to the respective colors, full-color, high-resolution, page-wide printing is achievable.

Each of the glass print head structures is comprised of an assemblage of individual glass fiber tube sections, such as those shown in FIG. 3, each of which has been sintered, drawn and sliced. After such processing, the individual glass fiber tube sections are subjected to further processing by which semiconductor manufacturing techniques are used to deposit thereon, heater resistors and control circuitry (not shown in FIG. 5) by which the individual orifices of the individual tubes can be separately addressed.

As shown in FIG. 5, each of the print head sections 510, 512, 514 and 516 has emanating from it, three leads or terminals, each set being identified by reference numerals 518, 520, 522 and 524. Electrical signals impressed upon the three terminal inputs, are used to control ink ejection from individual capillaries.

Ink ejection on a tube-by-tube basis is accomplished in the preferred embodiment by way of semiconductor current-latching circuits formed by depositing appropriate layers of semiconductor material into the interior or face of one end of each of the glass tube sections. Each current latching circuit is separately addressed and controllable.

Figure 6:
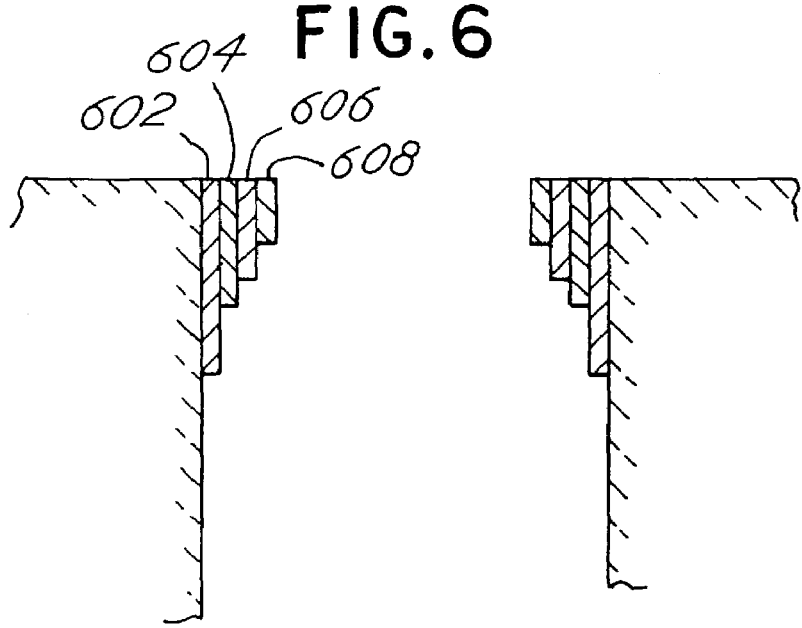
FIG. 6 shows a cross sectional view of a single glass fiber tube section and the semiconductor components deposited at the outlet side of the tube from which ink is ejected.

FIG. 6 shows a simplified cross sectional view of one glass tube section 600. It can be seen in FIG. 6, that there is a first semiconductor layer 602 followed by a series of other layers 604, 606 and 608. Each of the semiconductor layers is used to control the heating and ejection of liquid based ink and ink components. Those skilled in the semiconductor fabrication art will recognize that various layers are required to form even a passive device and that the layers might require masking and etching. At least one layer is a conductive layer carrying electrical signals to semiconductor devices fabricated within the interior of the glass tube section 600 that is used to heat the used to heat liquid based ink and ink components to boiling. Layers 604, 606 and 608 might be isolation layers as well as semiconductor layers used to develop resistances, each of which is used to form control circuitry and resistive heating elements. The topology of the circuit formed on or in the glass tubes is shown in subsequent figures and described hereinafter.

Figure 7:
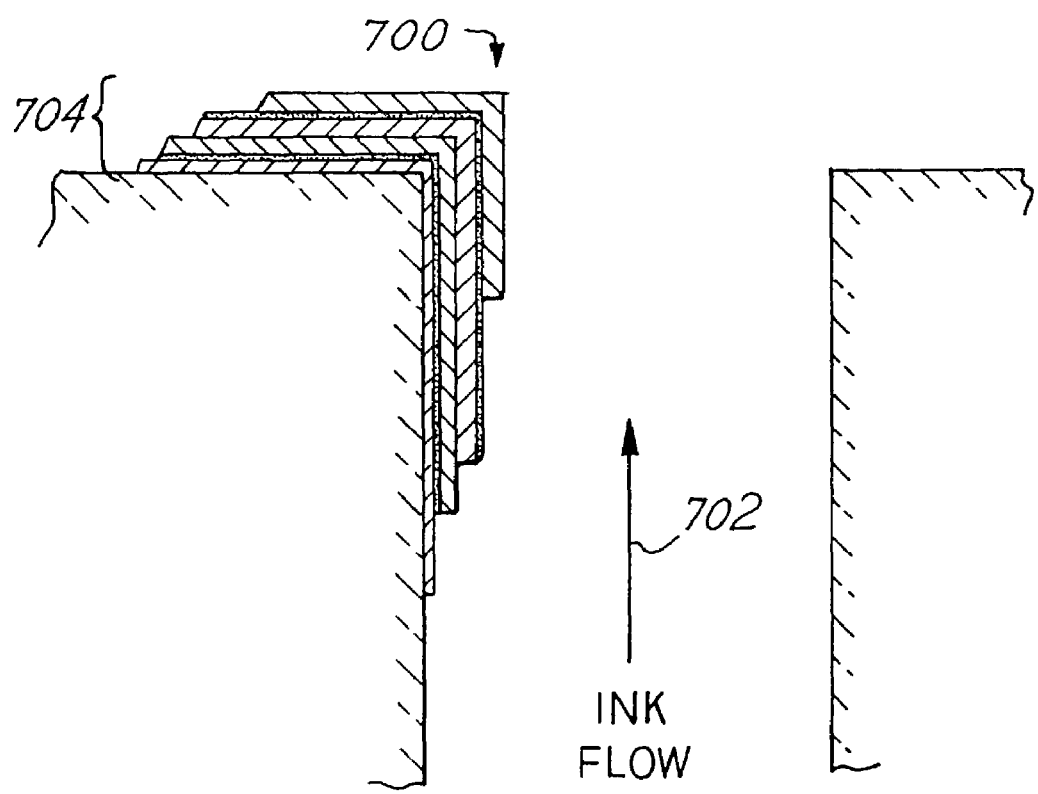
FIG. 7 shows a cutaway section of one end of a glass fiber tube section of that shown in FIG. 6 in greater detail.

FIG. 7 shows an enlarged view of an inverted portion of a single glass tube section 700. Ink flows down (up as shown in the figure) the tube section in the direction indicated by the arrow 702. Semiconductor layers, 704 deposited on the interior portions of the tube 700 form conductive traces, semiconductor layers, insulating isolation layers and resistive layers used to address the semiconductor drive circuitry and to provide current to a heater resistor also formed within the tube section. Both the heater drive circuitry and heater resistors can be formed using well-known semiconductor processes. The current through the resistor heats the ink (normally held in place by capillary action) to boiling which causes the ink to be ejected in small droplets that land on the print media. As happens in prior art thermal ink jet printers, the droplets land on the print media and then dry to a solid state.

Vacuum deposition techniques, evaporation and sputtering among others, are used to create semiconductor circuit elements within the interior of the glass tube sections. A mechanism such as that shown in FIG. 8 can be used to deposit material into the actual interior sections of the tubes. A glass tube substrate (after sintering, drawing, sectioning and etching) 802 can be mounted onto a platen 804 that rotates at some predetermined rate about an axis 806. A source of material 808 to be deposited into the tubes is provided such that the trajectory of the ions or particles follow a trajectory at an angle of theta by which a small portion of material is deposited at or near the top of one end of the tube section such as that shown in FIG. 9. The resultant deposition in the hollow tubes is typically an annular (an annulus) deposition of material although alternate embodiments would include crescent-shaped depositions.

The tube section 900 shows an amount of material 902 deposited onto at least the upper and top interior sections of the glass tube 900. By appropriately masking interior annular sections of the glass tubes, it is possible to form a complete semiconductor device, such as an SCR, transistor and resistors, on the interior of the glass tube, small enough to allow the ink to continue to flow through that individually controllable from external circuitry.

Figure 10:
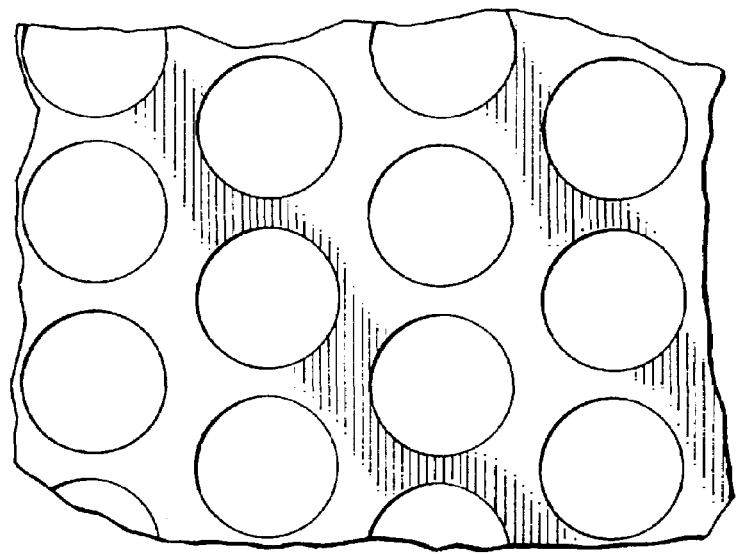
FIG. 10 shows a section of a glass substrate print head.

FIG. 10 shows a section of a substrate formed from sintered drawn glass fiber tubes the diameter of which is on the order of 20 micrometers. Each of the several tube orifices shown in FIG. 10 might be used to carry ink of a particular color such that the failure of one orifice by clogging, or semiconductor failure would not adversely affect the print quality as adjacent tube sections would presumably continue to function.

Figure 11:
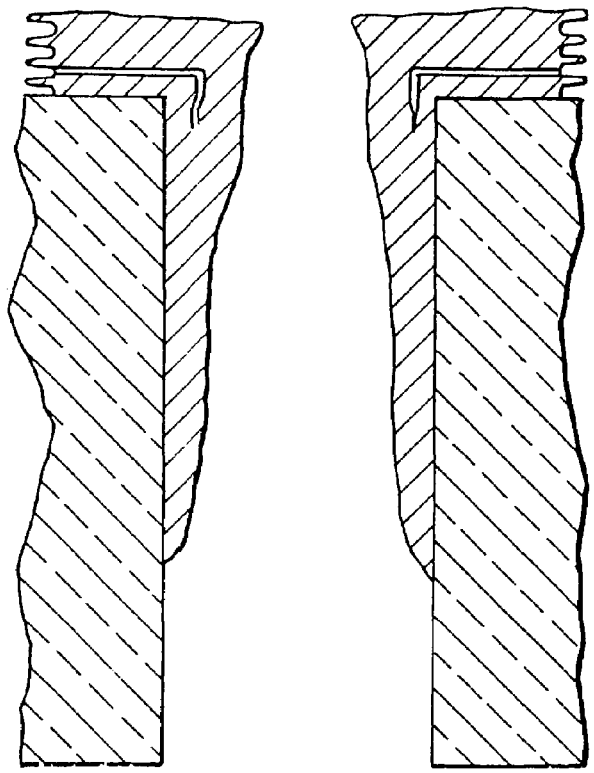
FIG. 11 shows how the several layers deposited into the interior of the glass tubes might appear after manufacturing.
Figures 12A, 12B, 12C, 12D:
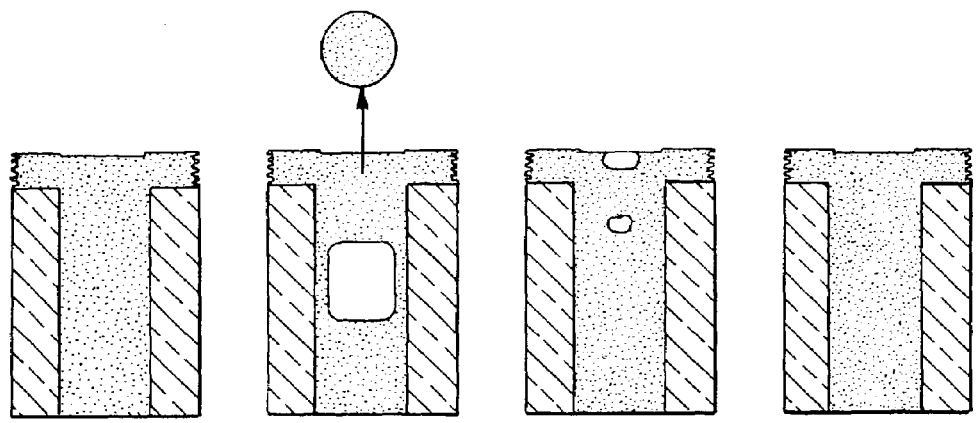
FIGS. 12A–12D show the progression of a droplet of ink as it is ejected from one of the glass tube sections.

FIG. 11 shows how the multiple layers might appear after deposition at the top of one section of the glass tube sections. FIG. 12A shows the appearance of one of the tube sections prior to the ejection of an inkjet droplet. FIG. 12B shows the formation of a bubble within the tube section by heating the water based ink under the control of semiconductors deposited into the interior of the tube 12B. FIG. 12C shows the ejection of the droplet and collapse of the air pocket until the tube is finally refilled as shown in FIG. 12D.

A problem with controlling the individual nozzles of that structure shown in FIG. 10, is that individually addressed nozzle control circuitry would require hundreds or even thousands of different logical addresses requiring accompanying address decoding logic. Such numerous connections make the device susceptible to numerous failures. An alternate solution to this control problem is to individually address each of the nozzle heads by way of a totem pole series of current latching circuits, such as that shown in FIG. 13.

Figure 13:
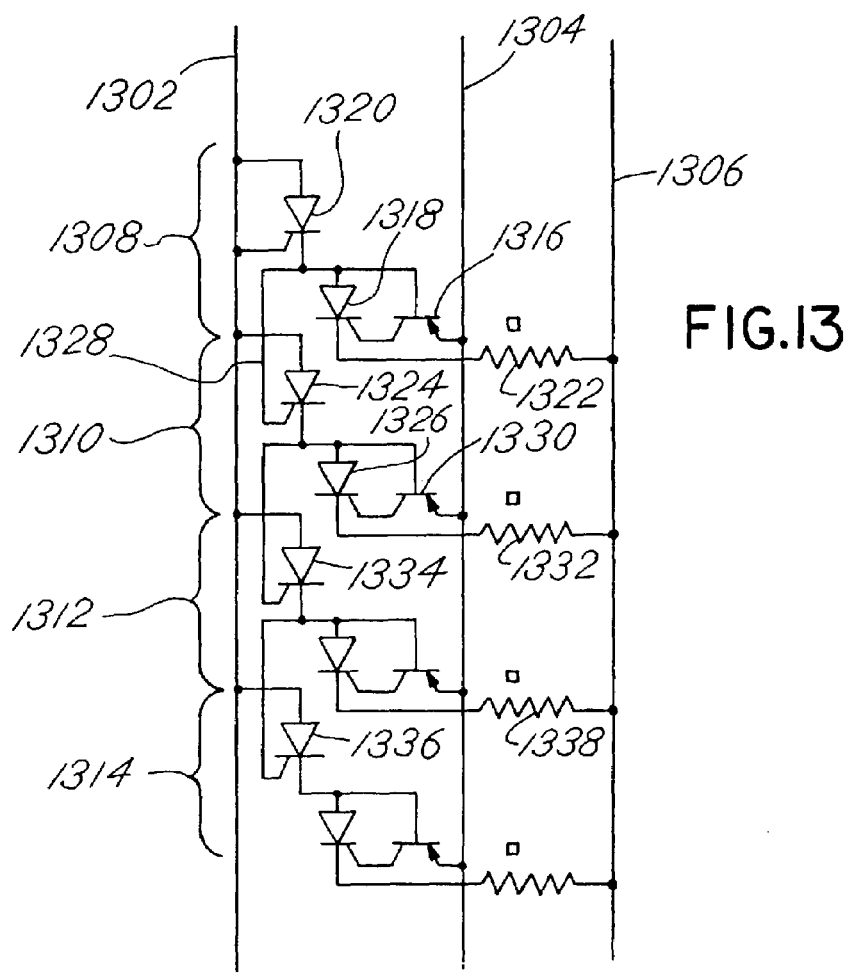
FIG. 13 shows a schematic diagram of the control circuitry by which individual heater resistors are addressed sequentially.

In FIG. 13 three (3) individual control lines 1302, 1304 and 1306 can be used to individually address an unlimited number of control circuits 1308, 1310, 1312 and 1314 by means of synchronized pulsed trains impressed upon the P and S control lines 1304, 1306 that are operatively coupled to (electrically connected in the preferred embodiment) to each of the control circuits 1308, 1310, 1312 and 1314.

Each of the control circuitry elements 1308–1314 is comprised of two, series connected SCR's. One of the series-connected SCRs is fired by a control pulse delivered through a transistor 1316 to the gate terminal of a second of the two SCR's 1318 and 1320, causing both SCRs to turn on. An inherent characteristic of an SCR is that once it is triggered to the "on" state by positive voltages on the gate and anode, the SCR stays on until it is reverse biased or the voltage is removed from the anode.

In FIG. 13 a pulse applied to both the P and S lines synchronously, causes the first SCR 1320 to forward conduct and to apply a voltage to the gate of the second SCR 1318. By maintaining a relatively small residual bias voltage on the P line, both SCR's can be held in a forward biased "on" condition indefinitely. By minimizing this bias voltage, only a small amount of current flows through the heater resistor 1322, which is deposited into the interior portion of one of the annular sections shown in the aforementioned figures.

The first pulse applied to the P and S terminals acts only to turn on the first current switch circuit 1308 (comprised of the two SCR's 1318 and 1320 and the transistor 1316.) The subsequent current switching stages are not affected because at the instance of the first pulse and throughout its duration no signal is available at the gate of the first SCR 1324 of the second current latching circuit 1310. Similarly, because there is no potential available at the cathode of the SCR 1324 the second SCR 1326 of this second current latching circuit 1310 can also not turn on.

Once the first SCR current latch 1308 is turned on, another voltage pulse is applied to the gate 1328 of the SCR 1324 such that upon the application of another subsequent voltage pulse to the P terminal, SCR 1324 will also turn on forward conducting and applying a voltage to the cathode of the SCR 1326. If a pulse is simultaneously applied at the S lead, transistor 1330 will also turn on causing the SCR 1326 to forward conduct driving current through yet another heater resistor 1332.

During the occurrence of the first two pulses, the third current switch stage 1312 remains deactivated because the gate of the SCR 1334 had no voltage applied to it nor did the gate or cathode of the SCR 1336 have any bias voltage applied thereto.

On the application of a third synchronous pulse to both the P and S leads, the third current switch stage 1312 also will turn on also driving a small amount of current through the third heater resistor 1338.

In like fashion, subsequent stages of the totem pole arrangement shown in FIG. 13 can be latched to an on state whereby the SCR's are put into a forward biased conducting state driving current through the heater resistors coupled to the cathode terminal of the second SCR stage of each current latch. The pulse train applied to the totem-pole connected current sources can be considered to a stream of addressing pulses in that the precise timing, duty cycle and frequency of the pulses can select which current driving circuit is latched on. After they are latched on, a small bias voltage can maintain the SCRs in the on state but if that bias voltage is kept relatively low, it will not produce currents through the heater resistors that is sufficiently large to vaporize ink in the capillary tubes where the resistors are deposited.

By applying a large-amplitude voltage pulse to all of the SCRs, those in the on state will deliver significant amounts of current to the heater resistors. Fluid in contact with the resistors will be vaporized and ejected from the capillary tubes onto the print medium. The firing voltage and current might need to be one to two orders of magnitude greater than the control pulses.

By appropriately selecting the pulse width and the frequency of the control pulses applied to the P and S lines, it is possible to individually address individual current latching circuits to either an on state or to remain in an off state. Distributed capacitance and inductance existing between the various elements of each current latch will determine the time constant needed to be counted for in the frequency, duty cycle, and voltage level of the pulse train used to address the individual stages. Once the stages are latched to an on state, the magnitude and duration can be determined from empirical data.

By individually addressing the current switch stages 1308, 1310, 1312 and 1314 it is possible to individually address individual current latching circuits that could be formed into the interior regions or on the surfaces of a glass substrate formed using the methods described above by sintering, drawing and slicing and thereafter vacuum depositing the SCR's, transistors and heater resistors onto either the surfaces of the glass structure or into the interior portions of the nozzles themselves.

By using semiconductor manufacturing techniques, which are well known to those skilled in the art, the geometries involved in the glass print head structure readily would accommodate the formation of multiple SCR's, transistors and resistors within the orifices of the glass structures themselves. Deposition of P type and N type semiconductor material, which would be required to form the individual transistors, could be accomplished by sputtering, evaporation or gas deposition techniques. Dielectric layers which would be required between the various N and P type semiconductor layers could also be achieved by other gas deposition or sputtering. Excess material might be etched away to form individual circuit traces by a reactive ion etch sputtering or gas etching using CF4. The structure shown in FIG. 5 might be used with either a face shooter or edge shooter print head design although the preferred embodiment of the invention contemplates use as a monolithic-type print head.

Photolithographic masking techniques would also enable the precise positioning of circuit traces to contact surfaces by which the lead lines 518, 520, 522 and 524 of FIG. 5 might be attached to connection areas of the substrate for connection to appropriate control circuitry controllers.

By sequentially addressing each of the nozzles of the glass print head structure for use in a page wide print head, it is possible to address hundreds or perhaps thousands of individual nozzle elements using only three control lines as shown in FIG. 13. Alternative embodiments would of course include parallel and asynchronous serial addressing schemes but these might require individual address lines and/or decoding circuitry in order to individually address and enable current driving devices for each orifice.

The preferred embodiment of the glass print head structure is expected to be only 200 microns in thickness, fragile enough to require a carrier during the manufacturing process. The center to center spacing for adjacently placed drops could be 10 to 200 microns, but the edge to edge spacing is zero microns because the glass fibers are sintered together. The matrix does not need to be, (and probably will not be) entirely open honeycomb pattern. Some fibers will be filled with the same type of glass as the outer sheath and so will remain filled after the etching process. Spacing between the individual glass fiber orifices would be quite small, and likely less than one micrometer.

By use of the foregoing glass fiber structure, and method of manufacturing and method of control, it is possible to realize a page wide print head structure that includes individually addressable print head elements. A number of advantages might be realized by such a structure. Overall printing speeds might be significantly increased beyond that which is currently possible using moveable print heads. Even if the sequential pulse trains required to address individual print head elements works slow, the increase in speed that would be achieved using a page wide print head would likely overcome any timing constraint imposed upon the sequential addressing of the control circuits.

The failure of one or even more individual print elements in a glass honeycomb print head could readily be compensated by increased firing rates of adjacent printing elements. Nozzle failure however is preferably compensated for by a duplicate nozzle array and circuit assembly of the same color. Fine resolution would also be achievable because of the close spacing of the glass fiber orifices.

Figure 14:
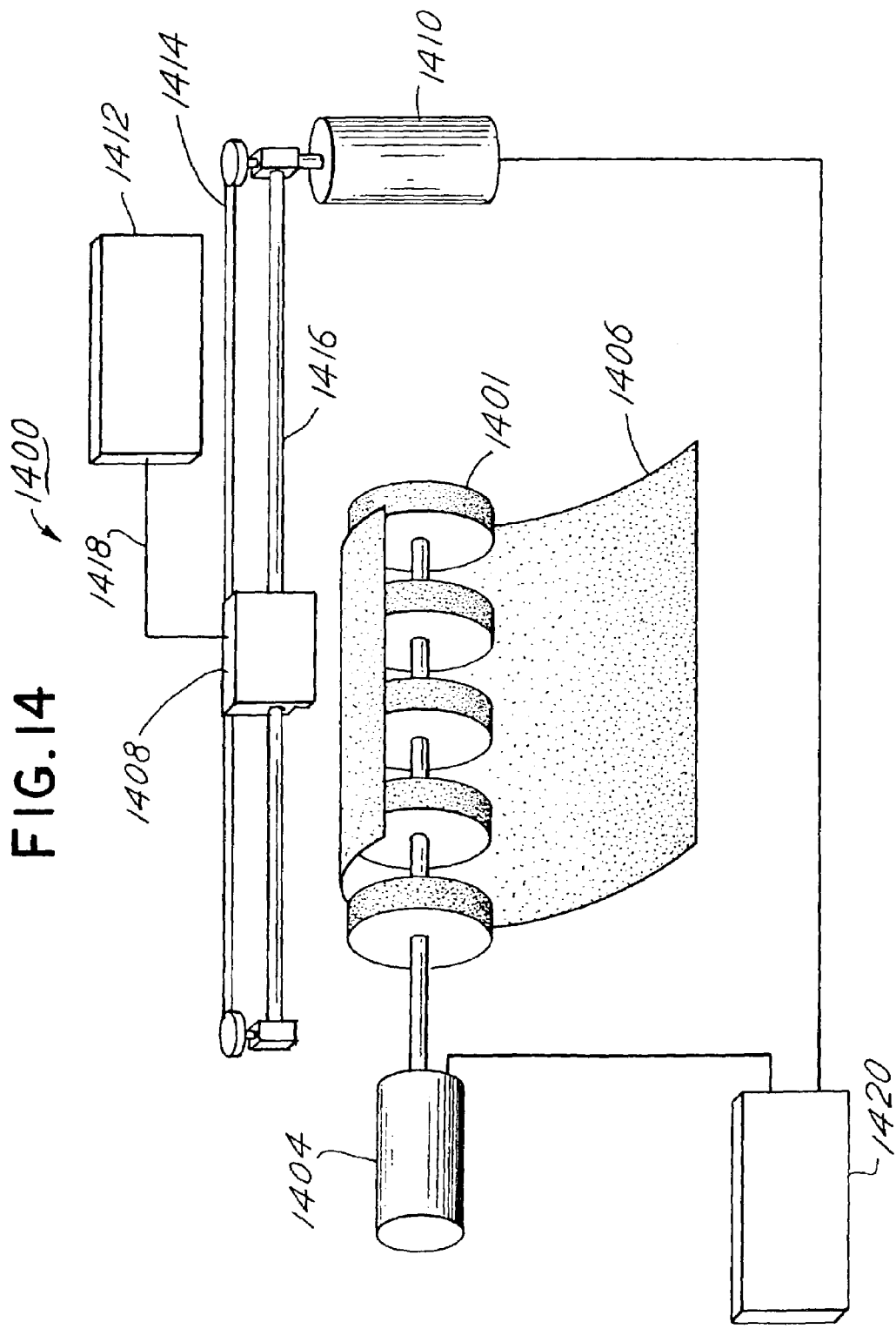
FIG. 14 shows printer that might employ the glass print head disclosed herein.

FIG. 14 shows an exemplary printer 1400 that might use the glass print head and control circuitry disclosed above.

A series of rollers or platens 1402 rotates under the power of a platen motor 1404 so as to position a print media 1406 at a position below the print head 1408 described above. As shown in FIG. 14, the print head 1408 is moveable with respect to the media 1406 under the control of a carriage motor 1410 the rotation of which acts to wind and unwind a drive belt or cable 1414 to which the print head 1408 is attached. Movement of the belt or cable 1414 acts to slide the print head 1408 along a rod 1416 over which the print head 1408 moves.

Electrical control signals are delivered to the print head and the electronics thereon from the control circuitry 1412 described above through a flexible ribbon cable or equivalent 1418. The position controller 1420, which in the preferred embodiment is an appropriately programmed microprocessor, micro-controller, ASIC or equivalent, acts to move the platen motor 1404 and the carriage motor to position the print head 1408 at the proper location with respect to the media 1406. At least one alternate embodiment of the printer shown in FIG. 14 would be a fixed print head the dimensions of which would substantially cross the media 1406 so that virtually the entire page width might be printed.

Additional advantages and combinations will be apparent and are within the scope of the appended claims.

We claim:

1. A controller for a print head comprised of:
    a. a series of multi-terminal latching current sources, each current source having first, second and third inputs and first and second outputs said series of multi-terminal latching current source configured to have:
        1) the first current source having its first and second inputs coupled to a first signal source and the third input coupled to a second signal source, said first output of said first current source coupled to a heater resistor for said print head;
        2) each of the other N-number of multi-terminal latching current sources coupled in series behind said first current source whereby the $N^{th}$ multi-terminal latching current source has its first input coupled to said first signal source, its second input coupled to said second output of the $N\text{-}1^{th}$ multi-terminal latching current source and the third input of the $N^{th}$ multi-terminal latching current source coupled to said second signal source, said first output of said $N^{th}$ current source being coupled to an $N^{th}$ heater resistor for said print head;
    whereby said multi-terminal latching current sources are sequentially latched to a conductive state by a sequence of synchronous voltage pulses on both said first and second signal sources.

* * * * *